United States Patent [19]
Askowith et al.

[11] 3,974,330
[45] Aug. 10, 1976

[54] MINIATURE UNDERWATER BORE HOLE INSPECTION APPARATUS

[75] Inventors: Burton J. Askowith; Merphis C. Ellis; Robert H. Oberlies; Frank A. Peterson; Parmanand Prasad, all of Huntsville, Ala.

[73] Assignee: Sperry Rand Corporation, New York, N.Y.

[22] Filed: June 9, 1975

[21] Appl. No.: 585,004

[52] U.S. Cl. .............................. 178/6.8; 178/DIG. 1; 178/DIG. 38
[51] Int. Cl.² ......................................... H04N 7/18
[58] Field of Search ............... 178/DIG. 1, DIG. 38, 178/6.8

[56] References Cited
UNITED STATES PATENTS

| | | | |
|---|---|---|---|
| 2,632,801 | 3/1953 | Donaldson | 178/DIG. 1 |
| 2,849,530 | 8/1958 | Fleet | 178/DIG. 1 |
| 3,761,623 | 9/1973 | Hara | 178/6.8 |
| 3,780,224 | 12/1973 | Levine | 178/DIG. 38 |

*Primary Examiner*—Robert L. Griffin
*Assistant Examiner*—Edward L. Coles
*Attorney, Agent, or Firm*—Howard P. Terry

[57] ABSTRACT

A miniature submergible inspection device is provided for the visual inspection and survey of the strata of dry or water-filled bore holes providing data for video display or recording at the earth's surface and controllable therefrom. Adapted for reversing azimuth scan of the bore hole surface, the raster scan generates a display presented to the operator that does not rotate with the scanning of the surface and that is always upright.

12 Claims, 7 Drawing Figures

MINIATURE UNDERWATER BORE HOLE INSPECTION APPARATUS

BACKGROUND OF THE INVENTION

1. Field of the Invention

The invention pertains to a miniature water-proof video camera tube surveying system for the exploration of the interiors of bore holes or pipes and more particularly concerns such apparatus for investigating the geologic character of earth formations or the like penetratable by small diameter bores.

2. Description of the Prior Art

In the prior art bore hole surveying instruments, it appears to be customary to mount an image tube with a viewing face plate in a plane generally perpendicular to the bore hole axis in a tubular leak-proof envelope provided with a cylindrical viewing window forming a continuing part of the tubular leak-proof envelope. What part of the cylindrical bore hole surface is instantaneously viewed is determined by the position of a 45° mirror collecting light from the field of view which is reflected by the plane mirror into an image-forming lens placed in front of the image tube viewing face. Optical scanning of the bore surface is accomplished by continuous or other rotation of the 45° mirror generally about the bore hole axis and the viewed scene is presented at the earth's surface on the cathode ray tube screen of a raster scanned monitor display device.

A major defect of such prior art systems lies in the fact that the view presented by the monitor cathode ray tube of the bore hole surface rotates as the plane mirror rotates so that the operator finds it impossible to maintain knowledge of the orientation of the surface instantaneously under view. The operator never automatically knows which direction is up or down on the displayed image because the scan mirror is rotating relative to the monitor cathode ray tube screen and the upward direction therefore rotates on the monitor screen at the same rate as the scanning mirror.

A further problem relates to prior art arrangements for indicating magnetic north with respect to the scanned surface of the bore. In past arrangements, a pulse of light occurs when there is actual alignment between the rotating mirror and a north pointing part of a magnetic compass. With the help of a rotating 360° scale mounted around the monitor cathode ray screen as a reference element, the magnetic direction of other parts of the viewed surface may be determined. This approach is complex and prone to error and measurements using it are not automatic and are, therefore, time consuming.

Prior devices suffer by yielding insufficient illumination of relatively low reflectance surfaces of the bore hole, especially in turbid water, since the required degree of simplicity and compactness has not been readily achieved with conventional light sources. Furthermore, prior art devices have used relatively high voltage power, transmitting it through the suspension cable, a practice found undesirable because heavier cables are required using extra thickness of electrical insulation.

SUMMARY OF THE INVENTION

The invention pertains to miniature submersible inspection devices for the examination of the inside surfaces of dry or water-filled bore holes, pipes, wells, or other hollow entities; by this means, data are provided at a monitoring station for video display or recording, the apparatus normally being controlled at the earth's surface or at the floor of a mine, for example. The apparatus is adapted for performing continuously reversing scan of the bore hole or other interior surface, the raster scan display being presented to the operator not rotating with the optical scanning of that surface and always remaining upright.

Magnetic north is detected and presented in a simple and automatic manner; according to the present invention, the novel optical system permits viewing of a full presentation of a compass and inclinometer which indicates the magnetic bearing of the surface viewed by the scan mirror and the inclination of the bore hole with respect to the vertical. The image is obtained by use of a partially reflecting scan mirror and remotely controllable lighting. When information on direction or inclination is desired by the operator, the compass and inclinometer illuminating lights are turned on to provide images of the compass and inclinometer. When these lights are off, neither the compass or inclinometer are seen on the monitor display.

Since compactness is required, quite adequate levels of illumination of the bore hole surface to be observed, are obtained by an internal lighting system using the recently developed quartz halogen lamps in properly designed light reflectors. The need for troublesome slip rings is eliminated by using flexible transmission cable for connecting relatively moving parts and a reversing motor drive rotating the 45° mirror and the image tube in unison through an included viewing angle of 380 degrees. The use of expensive and heavy transmission cable to support the instrument is eliminated by using relative low voltage levels within that cable, forming the required high voltage levels for the image tube system within the reversibly rotating support of the image tube and the mirror.

DESCRIPTION OF THE PREFERRED EMBODIMENTS

The novel geologic bore hole inspection system of the present invention is used, for example, for the inspection of relatively small water-filled bore holes deliberately drilled in making subterrestrial surveys of the character of earth material located at the proposed site of a large building or other heavy structure requiring secure footing. It may thus be used in determining the nature of the requirements for suitable foundations for such buildings. Additionally, the apparatus has application in the inspection of bores drilled for many other purposes or for the study of the interiors of hydraulic or other pipes or elongate cavities having major axes to determine their interior surface conditions without extensive disassembly of a piping or other system. For instance, for the bore hole survey purpose, the apparatus is used as is shown within FIG. 1 with a truck or other vehicle 1 containing an electrical power supply, display and recording utilization equipment 2, 3, 4, an electrical signal transmission cable reel (not shown) for supplying transmission cable 6 to a conventionally controlled winch 7. Winch 7 is placed on the earth's surface 8 over the bore hole 5 so that cable 6 may be played off directly above and into bore hole 5 generally along the major axis thereof. The suspended bore hole survey instrument 9 includes a support or input portion 15, a scan motor section 16, a power supply section 17, an image tube section 18, and a viewing section 19 for examining the surface of an adjacent earth's stratum 20 penetrated by the bore hole 5, each of which instrument sections will be described in further detail. There is provided a suitable slip ring assembly (not shown) at the axis of the truck-mounted reel for connecting utilization elements 2, 3, 4 electrically to electrical leads within transmission cable 6. Alternative winch and cable storage reel systems may obviously be employed.

Transmission cable 6 may be a conventional type of high strength cable of the armored type with dual layers of contrahelically wound steel wire on the outside of the electrical lead bundle, the armor preventing crushing of the electrical lead bundle by forces exerted by winch 7 and preventing abrasion of the cable. The transmission cable 6 includes a flexible coaxial transmission line 214 (FIG. 3a) preferably located at the axis of the cable. The transmission cable 6 and the winch 7 will be supplied with conventional means for indicating the amount of cable played into bore 5 and thereby the depth of the survey instrument 9 therein.

In a typical construction, survey instrument 9 is about 3 feet in length, 2.5 inches in diameter, and weighs about 30 pounds. Its envelope is preferably constructed of corrosion resistant stainless steel, being designed to withstand an external operating pressure of about 800 pounds per square inch at a depth of about 600 feet in water.

Figure 1:
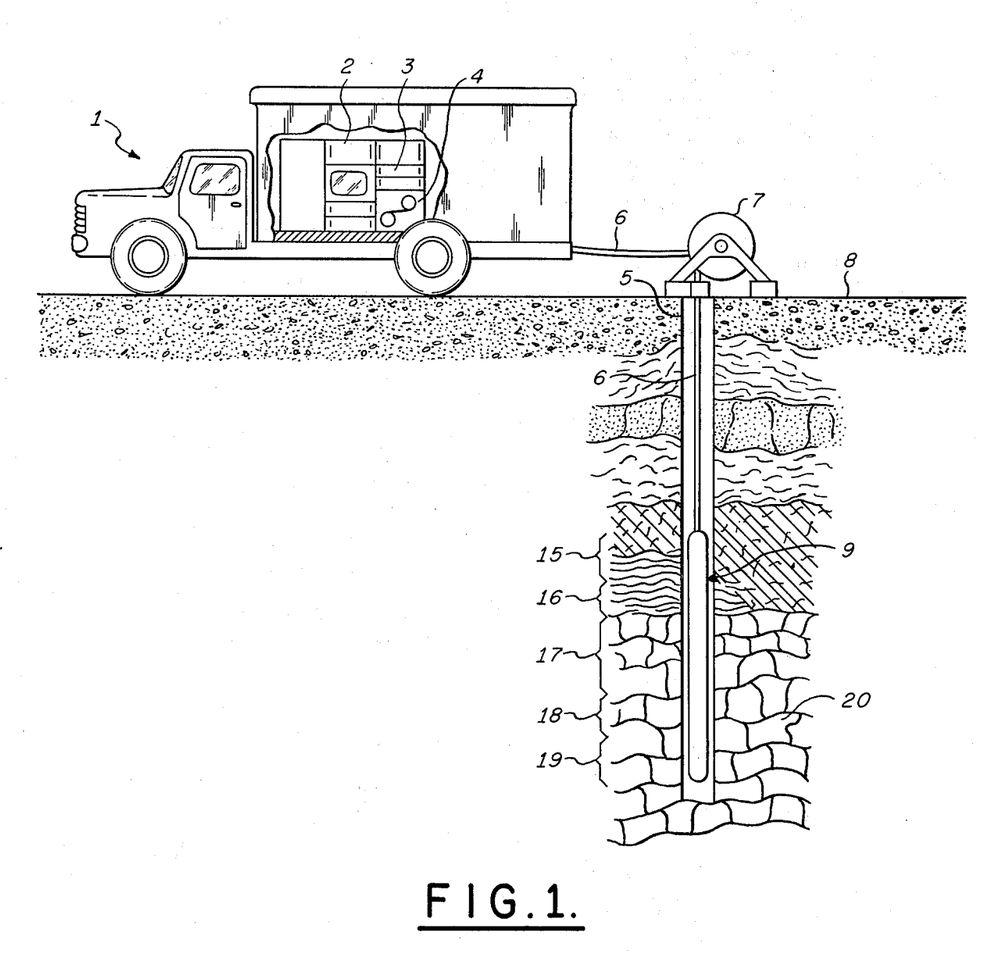
FIG. 1 is an elevation view, partly in section, illustrating the manner in which the inspection apparatus is used when submerged in a typical bore hole.
Figure 2A:
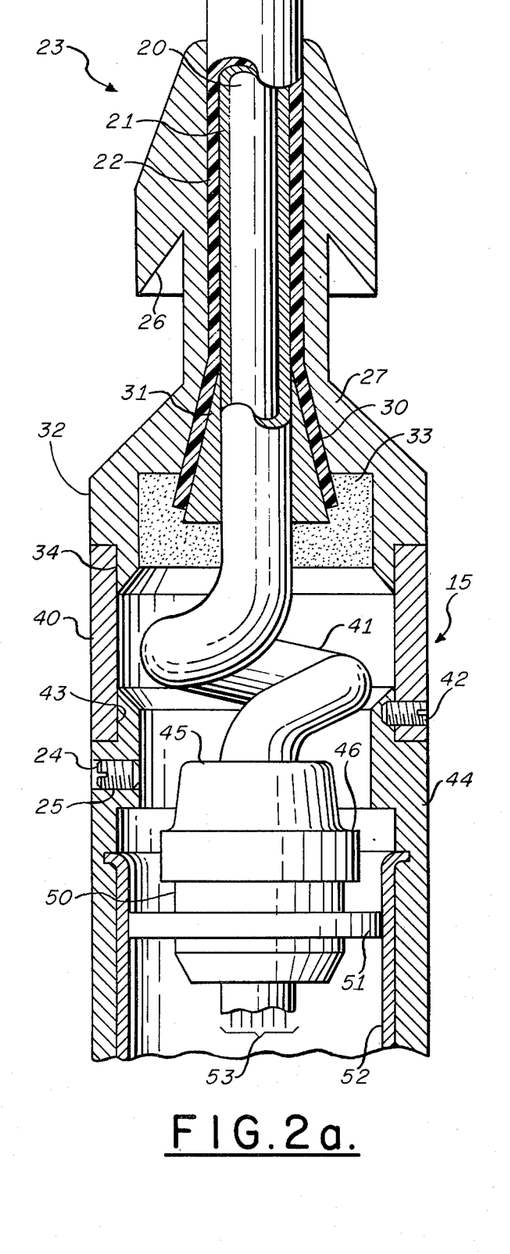
FIGS. 2a, 2b, 2c, and 2d are elevation views in partial section of successive portions of the submergible apparatus.

Referring now to FIG. 2a, there is shown the upper or input portion 15 of the bore hole inspection device as also illustrated in connection with FIG. 1, the apparatus being supported by the armored signal transmission cable 6 having sufficient strength to support the elongate bore hole inspection device 9 and to permit its ready introduction and removal with respect to the bore hole 5. The apparatus is supported from transmission cable 6 at the instrument head 23. For this purpose, the transmission cable 6 is shown as including an electrically insulated and protected plurality of electrical lead wires as indicated at 20 and 53 which, in turn, covered and protected by a copper wire mesh radio frequency shield 21, all of which are in turn impregnated with a liquid-impervious electrical insulation material to fill all voids in the transmission cable 6. The instrument head 23 of the device is supplied with an external re-entrant conical annulus 26 which may be used in an emergency for withdrawing the tool from a bore hole by a conventional grappling tool (not shown). Such a method of retrieval of the instrument is employed on those rare occasions in which it becomes wedged in a bore hole and cannot safely be removed simply by upward tension exerted on transmission cable 6.

Below annulus 26, the stainless steel envelope for the apparatus expands at 27 for accommodating equipment yet to be described. At the tapered expansion 27, there is located means for clamping transmission cable. This is provided by the use of annular wedge 31 surrounding the transmission cable 6 and forcing contrahelically wound steel wires 22 outward in a conical fashion as at taper 30 so that the transmission cable is not accidentally withdrawn from the surveying or inspection instrument when normal withdrawal forces are exerted upon the cable. A cylindrical portion 32 of the envelope which is integral with the expanding or tapered portion 27 includes a cylindrical cavity which may be filled with a potting compound 33 further to assist the clamping of transmission cable 6 within the apparatus. The cylindrical portion 32 also serves to permit joining of the hollow envelope tube 40 at interface 34 by a suitable means such as by silver solder. The tube 40 permits a lower portion 44 of the envelope to be attached thereto, as by machine screws such as screw 42, at the interface 43. The interface 43 and the coiled portion 41 of transmission cable 6 are provided at a detachable location so as to facilitate assembly and repair of the apparatus. The supported envelope tube 44 extends downward supporting, in turn, a hollow insert tube 52 which, in turn, rigidly supports an apertured partition 51. Within the aperture of partition 51 is mounted a fixed portion 50 of a conventional multilead electrical connector 45 whose upper portion is detachable in the usual manner by manipulation of ring 46. Thus, when the apparatus is opened at interface 43, transmission cable 6 may readily be disconnected from the cable at the bottom of the figure including multiple conductors such as electric conductors 53. These conductors continue on downward within the envelope of the apparatus and, at various division points, one or more electrical leads branch from them for operation of the various elements of the system, as will be further discussed in connection with FIGS. 3a and 3b. While these electrical connecting leads are illustrated fully in the latter figures, they are not all illustrated in FIGS. 2b, 2c, and 2d so as to avoid over-complication of the latter drawings.

Figure 2B:
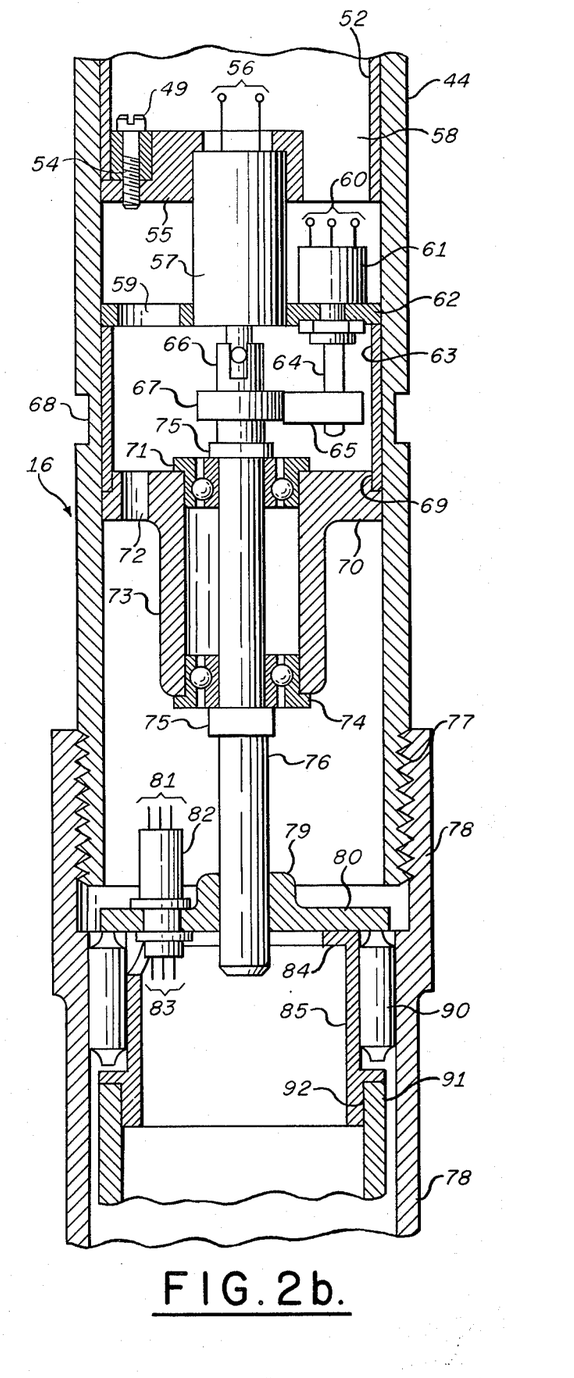

Referring now to FIG. 2b illustrating the scan motor section 16 of the instrument, the continuing outer envelope 44 is seen along with the continuing hollow insert tube 52. At the lower end of the latter is supported a partition 55 affixed by screw 49 to bracket 54 mounted on tube 52. Partition 55 includes a fixed aperture 58 through which the continuation of the transmission cable containing the electrical leads 53 may pass downward. It also serves as a mount for the reversible scan motor 57 which is operated by signals applied to leads 56, as will be further described. The second or lower end of motor 57 is held fixed within a second partition 62 rigidly supported within envelope 44 by the hollow insert tube 63. Partition 62 also includes an aperture 59 for the passage of the electrical cable of leads 53 and forms a second support for the reversible scan motor 57. A reversing switch 61 or other electromechanical reversing mechanism for controlling motor 57 is also mounted rigidly within partition 62, signals on its leads 60 being used to control operation of scan motor 57, as will be further described.

A further partition 70 is rigidly mounted at interface 69 with respect to insert tube 63 and is supplied with a hollow axial extension 73. It also includes an aperture 72 accommodating the cable passing through apertures 58 and 59. The purpose of the extended tube 73 is to support the spaced ball bearings 71 and 74 within which shaft 76 is mounted in cooperation with collars 75, 75 for rotation by reversible motor 57. Shaft 76 is coupled to the rotor of motor 57 by a spline or other fitting such as generally indicated at 66. It is also the support for an arm 65 which is mounted on shaft 76 by a suitable clamp 67. Rotation of motor 57 is brought to a halt when arm 65 moves the switch toggle 64 to a first extreme position, then causing motor 57 to reverse. Shaft 76 is then moved through slightly more than a complete circle, whereupon arm 65 again impacts toggle 64, again reversing switch 61. Cyclic operation may continue in this manner, scanning may be stopped at any desired azimuth position at the will of the operator.

Shaft 76 extends downward and has mounted upon it a hub 79 integrally supporting a rotatable disc 80 which, in turn, supports a hollow tube 85 at annular flange 84. The outer wall of tube 85 forms an inner bearing surface for a plurality of bearing rollers such as roller 90 while the inner surface of envelope 78 forms the outer bearing surface therefor. From the tube 85 extends a further rotatable tube 91 affixed at interface 92 and within which essential apparatus of the invention is mounted, as will be discussed in connection with FIG. 2c. As is seen in FIG. 2b, the extension 78 of the instrument envelope is removably attached by threads 77 to the upper section 44 of the instrument envelope. Removal and replacement is facilitated with a wrench applied to the flat surfaces 68 on the outer surface of tube 44. Further, it will be understood that the electrical cable passing through aperture 72 in partition 70 is attached to a multiconductor connector device 82 affixed within rotatable disc 80 and having respective input and output leads 81 and 83. The electrical cable passing through aperture 72 may be coiled in the space between the outer wall of element 73 and the inner wall of envelope 44 in such a manner that its end connected to input leads 81 is free to rotate. It is understood that connector 45 may have circular symmetry, while connector 82 may have a rectangular face with its narrow dimension in the plane of drawing. It will also be understood that apertures 58, 59, and 72 may be located in positions other than those illustrated in the drawing as a matter of convenience. In any event, the apparatus is so arranged that the non-rotatable electrical cable passing through aperture 72 provides electrical connections via leads 83 to rotatable apparatus located below the end of shaft 76 as will be seen in FIG. 2c.

Figure 2C:
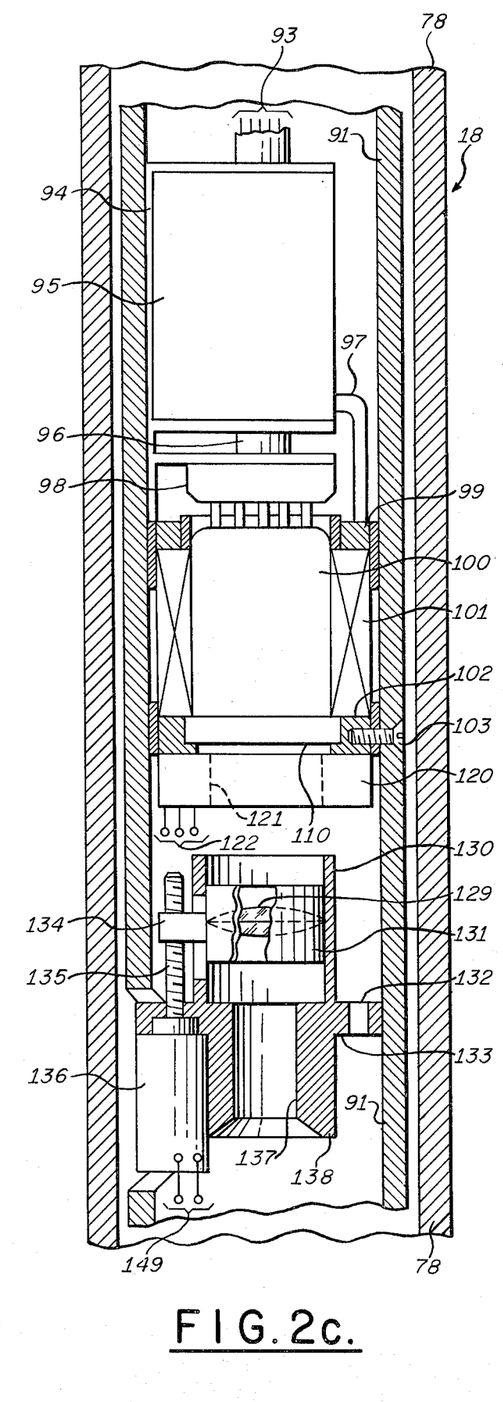

Pending below the scan motor section 16, as is seen in FIG. 1, is a continuing section 17 of the instrument, a section which may include ordinary power supplies and other circuits whose nature will be discussed in connection with FIGS. 3a and 3b. Pending from the power supply section 17 is the image tube section 18 seen in detail in FIG. 2c. FIG. 2c illustrates the continuation of the instrument envelope 78 and of the reversibly rotatable hollow tube 91; all elements to be described in FIG. 2c are contained in hollow tube 91 and rotate therewith with respect to envelope 78. For example, electronic circuits yet to be described are mounted in housing 95 and communicate with a cable containing electrical leads 93 and with an oppositely located electrical cable system 96 associated with image tube connector 98. The circuits in unit 95 are rigidly supported by bracket 94 from the inner wall of tube 91. Cables such as cables 96 and 97 supply control voltages for the image or camera tube 100, while other electrical leads (not shown) continue downward through the instrument to the apparatus of FIG. 2d.

Returning to the image tube 100 of FIG. 2c, which may be a conventional vidicon type of cathode ray light pick-up tube with a 1 inch diameter face plate 110, it is supported within the rotatable hollow tube 91 by an apertured partition 102 held in tube 91 by a plurality of fasteners such as screw 103. The upper end of image tube 100 is additionally held in appropriate axial alignment by apertured partition 99. Between partitions 99 and 102 are disposed conventional deflection coils 101, as well as focusing and alignment coils, as required. The face 110 of image tube 100 and more particularly the lower part of image tube 100 supports an annular chassis 120 whose connecting electrical leads 122 are used as will be further discussed in connection with FIG. 3b. The aperture 121 in chassis 120 permits light to pass through the chassis 120 after focusing by a lens 129 in lens mount 131 to the face plate 110 of image tube 100.

Lens mount 131 is axially adjustable as to position within a cooperating hollow tube 130 mounted on partition 133 within rotatable tube 91. Partition 133 is provided with an aperture 132 through which may be threaded electrical leads to equipment found in the apparatus of FIG. 2d. Partition 133 is also supplied with an aperture and clamping arrangement for mounting the lens focus control motor 136. Operation of motor 136 according to control signals applied to leads 149 causes rotation of the threaded shaft 135. Shaft 135 cooperates with a similarly threaded bore in the arm 134 projecting through a suitable slot in tube 130. In this manner, the lens 129 within lens mount 131 may be moved axially with respect to the face 110 of image tube 100 so that the scene being viewed by the image tube may be clearly focused on face 110. Projecting downward from partition 133 is a tube 138 having a generally cylindrical inner surface 137 which acts conveniently as a light shield and as a portion of the conventional support for the focusing motor 136.

Figure 2D:
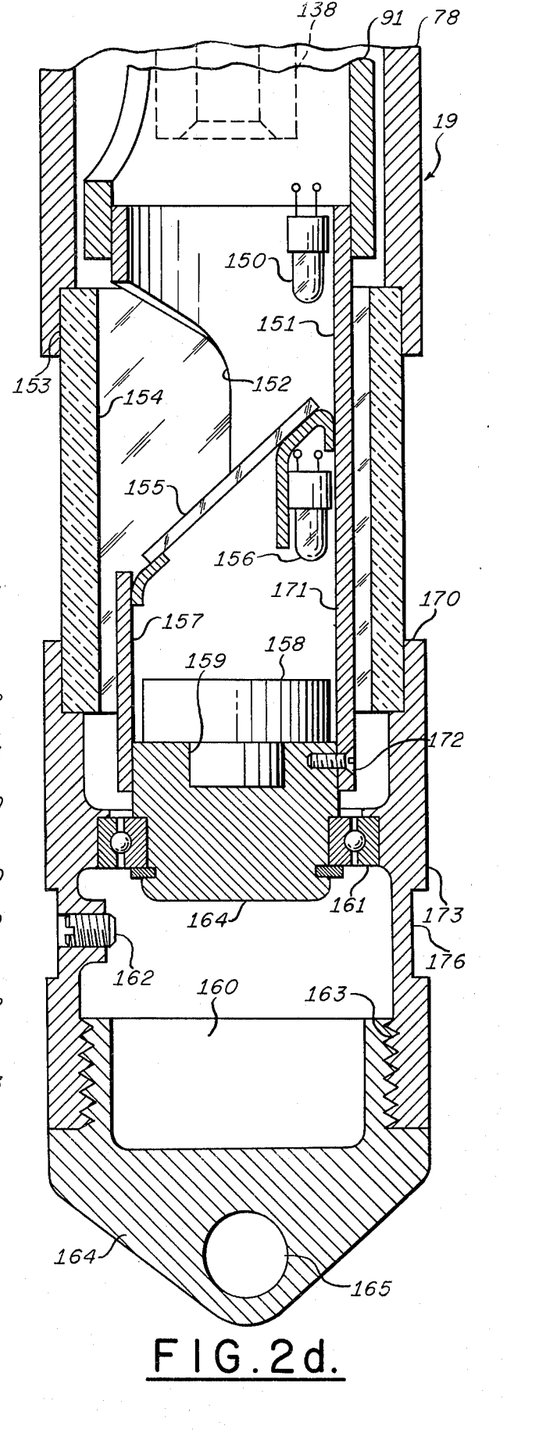

Referring to FIG. 2d wherein the final lower portion of the instrument is shown, portions of the outer envelope 78 and of the reversibly rotatable tube 91 also are shown, as well as the location of the light shield 138. The section 19 of the apparatus shown in FIG. 2d is the viewing section providing mirror means for viewing the cylindrical surface of an earth's stratum to be examined by the instrument. To permit such viewing, the outer metal envelope 78 is ended at interface 153 and an envelope is continued downward in the form of a high strength glass or quartz optical quality viewing window 154. Window 154 may be fastened at interface 153 to metal envelope 78 by an epoxy resin or other suitable leak-proof adhesive. So also may the lower end of window 154 be fastened at its lower interface 170 to the continuing metal envelope 173 of the apparatus. A primary element of the viewing apparatus is a front surface mirror 155 which is partially transparent and which is supported by suitable fasteners within the lower part 157 of hollow tube 151. Tube 151 is affixed to the rotatable tube 91 and rotates therewith. The upper portion of tube 151 is cut away at 152 so that light may be transmitted with respect to window 154 and mirror 155 upward to the lens 129 of the lens holder 131 of FIG. 2c. A plurality of lamps such as lamp 150 is provided, the light from which passes through window 154, illuminating the surface of the bore hole to be observed. It is thus seen that light from lamps such as lamp 150 and the mirror 155 is used to illuminate the surface of the bore hole under inspection, and that such light then returns through window 154 to impinge upon the partially silvered mirror 155. The reflected light travels upward axially within tubes 151 and 91, whereupon it is focused by the lens 129 within lens holder 131 as a true image on the face 110 of image tube 100. Since the water surrounding the instrument may be turbid, high intensity halogen lamps may be used for lamps 150.

Rotation of opening 152 and mirror 155 by scan motor 57 permits substantially 380 angular degrees of scan of the bore hole surface. This alternating rotation is facilitated because tube 151 extends below mirror 155, being held by fasteners such as screw 172 at its lower end 171 in an end piece 164. End piece 164 is supplied with a bearing indicated at 161 whose outer race is fixed with respect to the inner surface of envelope portion 173. The partition 164 supports a conventional compass and inclinometer 158 within bore 159. Compass and inclinometer 158 are illuminated at the will of the operator at lamp 156 and are arranged so that their images pass through partially silvered mirror 155 also to be focused at the viewing plate 110 at image tube 100. The elongate apparatus envelope is completed by the conical end cap 164 fastened within envelope element 173 by threads 163. The external surface of envelope portion 173 is provided with flats 176 so that a wrench may be used in assembling or disassembling the apparatus. The end cap 164 is supplied with a cavity 160 in which a drying agent may be placed for removing water vapor from the instrument interior after it is sealed. Before sealing, the threaded plug 25 of FIG. 2a and the similar threaded plug 162 of FIG. 2d may be removed and the instrument purged of water vapor by a flow of dry nitrogen or other dry gas, after which the threaded plugs 24 and 162 are reinstalled.

Figure 3A:
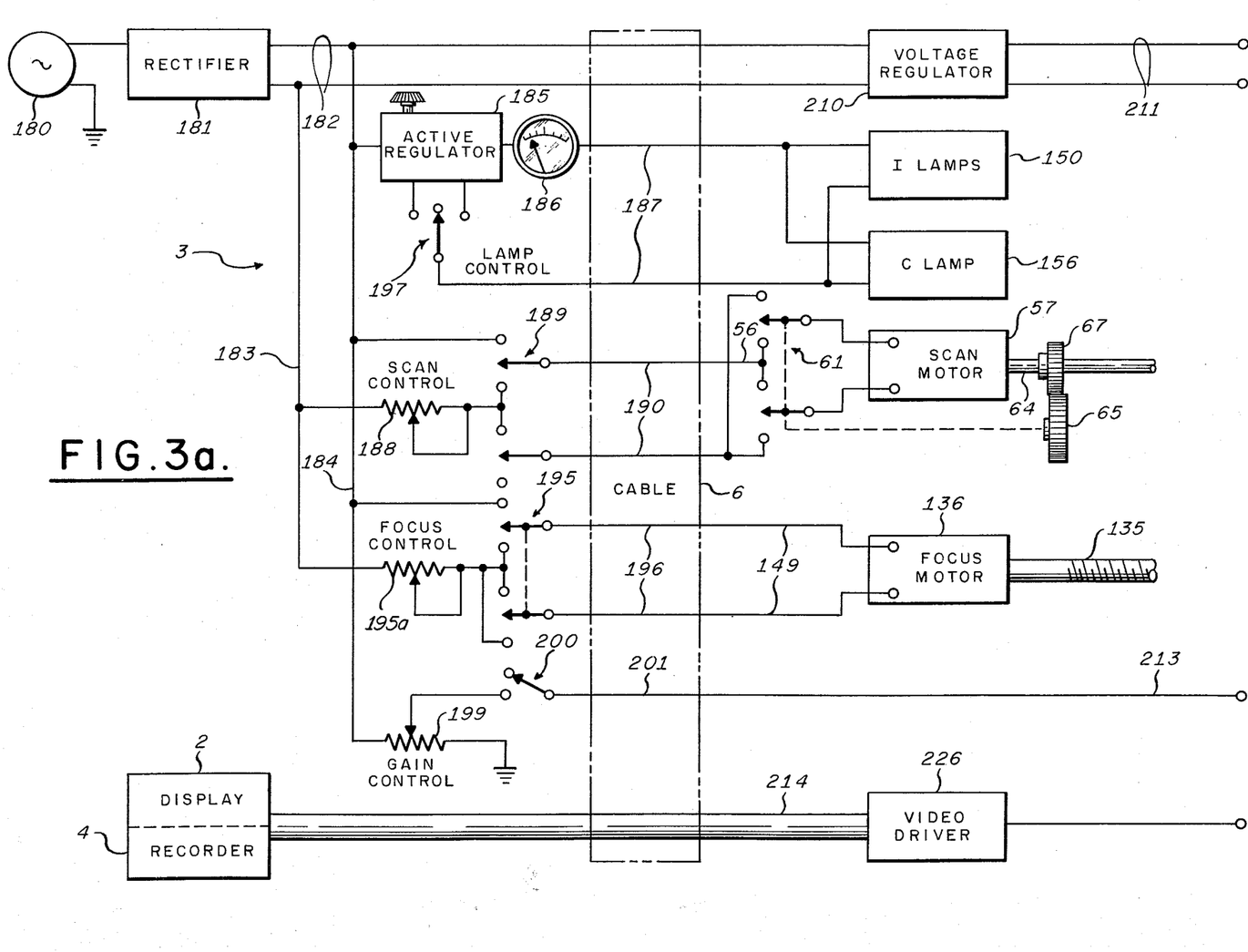
FIGS. 3a and 3b present electrical components of the apparatus including major electrical interconnections.
Figure 3B:
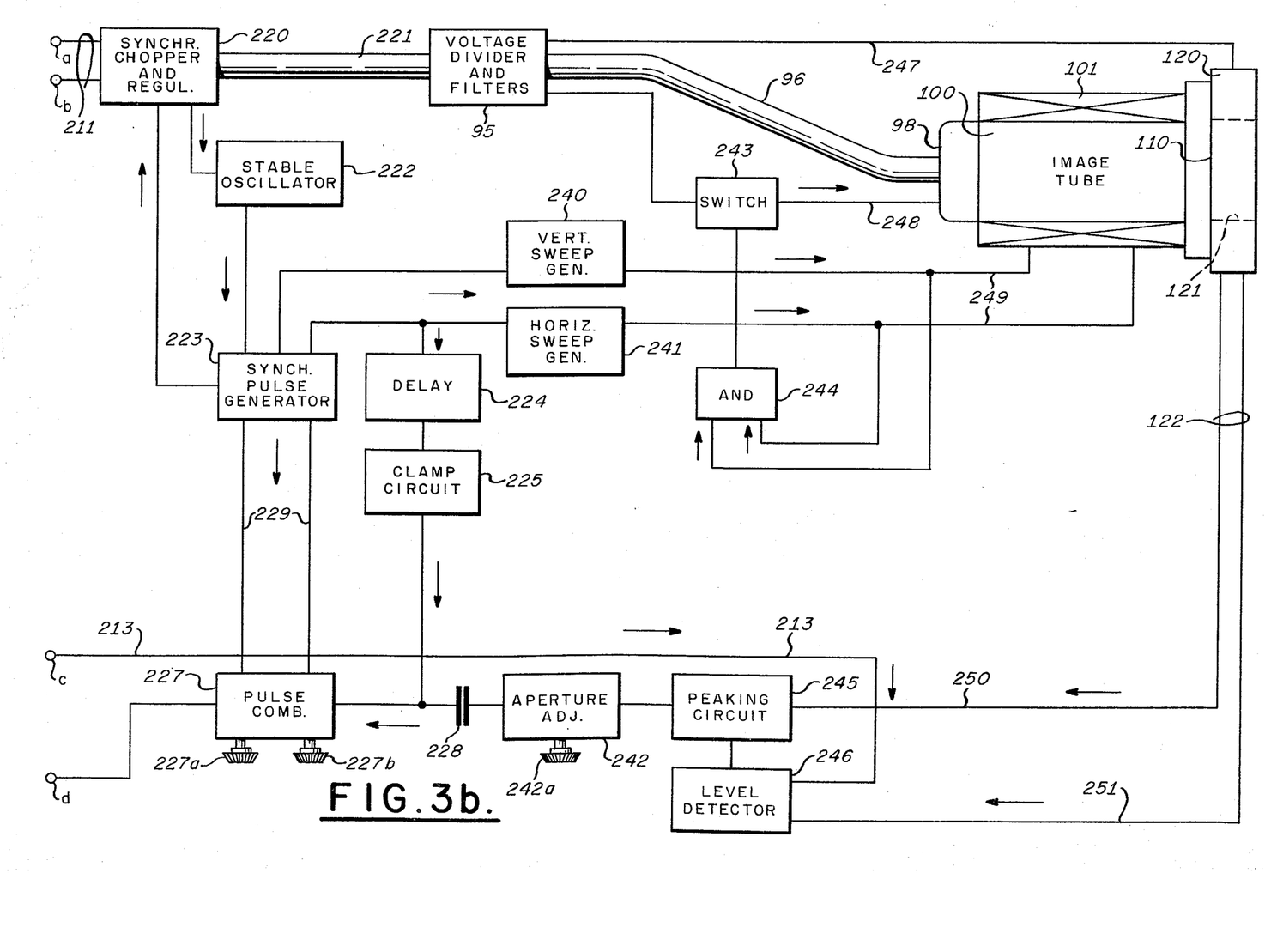

Referring now particularly to FIGS. 3a and 3b, the electrical components of the bore hole surveying system and their electrical interconnections with respect to the electrical transmission lines and mechanical and optical components of FIGS. 2a through 2d will be described. FIG. 3a, for example, illustrates in the left portion of the drawing electrical equipment located within the vehicle 1; such equipment includes a conventional electrical power supply 180 and the display 2 and recorder 4 which provide the operator with visual and other information with respect to the appearance of the bore hole stratum being examined. The system control 3 also found in vehicle 1 is illustrated in FIG. 3a to the left of the dotted rectangle 6 representing transmission cable 6. The equipment in the right hand portion of FIG. 3a is found within the submergible instrument 9, as is all of the apparatus illustrated in FIG. 3b.

Referring again to FIG. 3a, it is seen that the apparatus in vehicle 1 includes a rectifier 181 for supplying a unidirectional voltage in the order of 35 volts across leads 182. This relatively low unidirectional voltage is applied through transmission cable 6 to a series voltage regulator assembly 210 located within instrument 9 and supplying a regulated unidirectional voltage on the order of 24 volts on leads 211 for application in the apparatus of FIG. 3b, as will be described.

The rectified voltage appearing on leads 182 is additionally coupled by leads 183 and 184 to certain control elements found in control unit 3 which accomplish several additional purposes. For example, this signal is coupled through the active current regulator 185 and ammeter 186 and the selected current from regulator 185 is supplied by the electrical lead 187 to the halogen illumination lamps 150 shown also in FIG. 2d and which will be employed to illuminate the surface of the stratum to be examined according to the operation of switch 197. Further, the signal on leads 182 is supplied to a scan control potentiometer 188, adjustable by the operator as is the active regulator 185. Thus, the operator may interrupt the periodically reversing scan of the viewing assembly and change the direction and speed of scan at will. With the operator controlled reversing switch 189 closed, power is supplied by the cable lead 190 to leads 56 and thus through reversible switch 61 to the scan motor 57 of FIG. 2b. As was previously described, the output shaft 64 of scan motor 57 is equipped with a rotatable arm 65. Arm 65 actuates mechanical switch toggle 64, periodically reversing the leads coupled to the input of scan motor 57 and therefore periodically reversing the sense of rotation of shaft 64.

Further functions are performed by the voltage appearing between leads 182. For example, when switch 195 is moved to one or to the other of its extreme positions, a voltage of a first or of an opposite sense is applied by the cable leads 196 to the input leads 149 also shown in FIG. 2c of focus motor 136. Using this equipment, the lens 129 shown in FIG. 2c may be moved toward or away from the face plate 110 of camera tube 100. The signal on leads 182 is also supplied when the operator correctly closes the lighting control switch 197 via the cable leads 187 to the compass illumination lamps 156 seen also in FIG. 2d. The operator-settable gain control potentiometer 199 is adjustable and switch 200 is closed so as to supply a gain control voltage via the cable lead 201 and lead 213 in FIG. 3b to the level detector 246. As will be further explained, video and timing signals are combined in the apparatus of FIG. 3b and are supplied through a shielded coaxial cable 214, also making up a part of transmission cable 6 to the display 2 and the recorder 4 found within vehicle 1.

For the sake of simplicity in presenting FIG. 3b, it will be understood that several electronic circuits are described in general form, each of these being in themselves substantially conventional. In connection with certain of these individual circuits, means for the supply of electrical power is directly indicated. It will be understood that leads introducing electrical power into other of the circuit elements are not illustrated, as in conventional practice, merely for the sake of maintaining simplicity in the drawings.

In the system of FIG. 3b, as will be seen, the display 2 and recorder 4 are synchronized by the stable oscillator 222 which may be located, for example, in enclosure 95 of FIG. 2c or within a suitable volume of the rotatable tube 91 found in section 17 between FIGS. 2b and 2c. Stable oscillator 222 of FIG. 3b supplies a synchronizing reference signal of stable frequency and amplitude to the synchronizing pulse generator 223. This latter element supplies the synchronizing pulses used throughout the apparatus of FIG. 3b and, as noted in the foregoing, to synchronize the display 2. For example, the synchronizing pulse generator 223 determines the cyclic operation frequency of the synchronous chopper within circuit element 220, which element may include suitable voltage and current regulators. Element 220 supplies several power signals through cable 221 to an assortment of conventional voltage dividers and filters within enclosure 95. The power-supplying circuits are located close to image tube 100 so that only low voltages are transmitted within transmission cable 6. The outputs of the circuits within enclosure 95 operate the image tube 100 in a substantially conventional manner, voltages of appropriate levels being applied through cable 96 to the plurality of conventional control grids within image tube 100 via connector 98. An appropriate voltage is also supplied from enclosure 95 to the switch 243 which is applied via lead 248 and connector 98 as a cathode electrode voltage for image tube 100. Suitable power is supplied from enclosure 95 via lead 247 for operation of the high gain video amplifier within chassis 120.

A further function of synchronizing pulse generator 223 is to control the operation of the respective vertical and horizontal sweep generators 240 and 241 whose outputs are supplied via leads 249 to deflection coils within deflection coil assembly 101. So as to protect image tube 100 in the event that one of the sweep signals fails to appear on the input leads 249, these signals are sampled and applied to AND circuit 244. The output of AND circuit 244, if both sweep signals are present, permits switch 243 to be conducting, otherwise no signal is applied to the image tube cathode via input 248. A further input signal is the gain control signal appearing on lead 213 which, as previously described, permits manual adjustment of the video gain.

The foregoing arrangement supplies certain output signals; these include video signals on lead 250, which may be a shielded cable and synchronizing pulse signals on leads 229. The video signal on lead 250 is applied to a conventional peaking circuit 245 whose output, in turn, is applied to the aperture adjustment circuit 242. This latter circuit is a conventional circuit employed in normal image tube practice and permitting presetting by adjustment 242a of the correct aperture response for the vidicon tube. The output of circuit 242 is coupled capacitively by condenser 228 to the pulse combiner circuit 227. Before this signal is inserted in pulse combiner 227, a clamping signal is also added under the influence of the conventional clamp circuit 225. Circuit 225 is supplied with synchronizing pulses from generator 223 that are slightly delayed by delay 224. Delay 224 functions to permit the input signals to be clamped at an operating level at a time delayed with respect to each actual chopping event in synchronous chopper 220. The clamped video signals are combined in pulse combiner 227 with synchronizing pulses appearing on leads 229. The level of the blanking signal and of the synchronizing control signal may be manually preset therein by the operation of conventional circuits associated with the conventional controls 227a and 227b. As is noted in the foregoing, the combined video and synchronizing signals are coupled through video driver 226 which compensates for losses in cable 214 so that a useful signal may be applied in vehicle 1 for use in the utilization elements 2, 3, and 4. Operation of the configuration of FIG. 3b, since conventional elements are used, will be apparent to those skilled in the art and it will also be apparent that a conventional level detector 246 may be employed to use the output of peaking circuit 245 to supply via lead 251, an automatic gain control signal for use in video amplifier 120 in cooperation with a manually selected gain control signal found on lead 213.

Accordingly, it is seen that the invention provides a miniature inspection device for insertion in dry or water-filled bore holes, pipes, wells, or the like for the examination of inner surfaces thereof. The apparatus provides data at a monitoring station in the form of a video display or a video recording of the kind that is readily interpreted by the operator. Control of the submerged instrument is easily effected at the will of the user by operation of a versatile control system. Continuous scan of the surface to be inspected is achieved without the use of a complex slip-ring system and the direction of magnetic north and the inclination are presented in a simple and automatic manner. The display of information is readily interpreted by the operator in that it does not rotate with the scanning of the surface to be inspected and the view always remains upright in the monitor display. Adequate illumination is provided in the compact system by an improved internal lighting system. The use of heavy and expensive transmission cables to support the instrument is eliminated. It is, therefore, seen that the novel apparatus provides all of the information desired in examining surfaces of geologic bore holes and of other surfaces without the use of expensive and complex apparatus and with minimum opportunity for error, thus overcoming the defects of the prior art.

While the invention has been described in its preferred embodiments, it will be understood that the words which have been used are words of description rather than of limitation and that changes within the purview of the appended claims may be made without departing from the true scope and spirit of the invention in its broader aspects.

We claim:
1. Survey apparatus for the inspection of an inner surface of an elongate hole having a major axis comprising:
   electro-optical means for viewing said inner surface,
   means including electrical signal transmission cable means for determining the position of said electro-optical means along said axis,
   envelope means coupled to said electrical signal transmission cable means and forming therewith an elongate sealed envelope about said electro-optical means,
   said sealed elongate envelope means having optically transparent cylindrical window means for orientation generally along said axis,
   said electro-optical viewing means including:
      reversible motive means supported within said sealed elongate envelope means,
      hollow support means rotatable with respect to and within said sealed elongate envelope means generally about said axis by said reversible motive means,
      light source means and cooperating tilted mirror means affixed within said hollow support means for illuminating a portion of said surface through an aperture in said hollow support means and through said transparent cylindrical window means,
      image tube means cooperating with lens means both supported within said hollow support means for forming an image of said illuminated inner surface on the image sensing surface of said image tube means, and
      circuit means cooperating with said image tube means for transmitting timing and video signals via electrical leads within said electrical signal transmission cable means to remotely located utilization means.

2. Apparatus as described in claim 1 further including:
   compass means affixed opposite said image tube means with respect to said tilted mirror means within said hollow support means, and
   compass illumination means, said tilted mirror means being sufficiently transparent that an image of said compass means is formed on said image sensing surface of said image tube means only when said compass illumination means is actuated.

3. Apparatus as described in claim 2 including control means adjacent said utilization means coupled through said electrical signal transmission cable means for actuating said compass illumination means whereby an image of said compass means may be displayed by said utilization means.

4. Apparatus as described in claim 1 including reversing switch means actuated by said reversible motive means for automatically and cyclically reversing the sense of rotation of said hollow support means for permitting scanning of an arc of predetermined angular extent of said inner surface by said image tube means.

5. Apparatus as described in claim 4 including electrically actuable focusing means for accurately focusing said image of said illuminated surface on said image sensing surface of said image tube means.

6. Apparatus as described in claim 5 including control means adjacent said utilization means coupled through said electrical signal transmission cable means for operating said electrically actuable focusing means.

7. Apparatus as described in claim 4 including a flexible section of multiple-lead electrical signal transmission means for flexibly and conductively coupling signals of said electrical signal transmission cable means to said relatively rotatable image tube means.

8. Apparatus as described in claim 7 further including:
relatively low voltage power supply means coupled adjacent said utilization means into said electrical signal transmission cable means,
relatively high voltage converter means responsive to signals of said multiple-lead electrical signal transmission means for supply to said relatively rotatable image tube means.

9. Apparatus as described in claim 1 wherein said remotely located utilization means includes raster scan cathode ray tube display means responsive to said timing and video signals for providing a display of said inner surface.

10. Apparatus as described in claim 9 wherein said circuit means includes synchronizer means for synchronizing the operation of said image tube means and of said raster scan cathode ray tube display means.

11. Apparatus as described in claim 1 including control means adjacent said utilization means coupled through said electrical signal transmission cable means for determining the brightness of said light source means.

12. Apparatus as described in claim 11 including control means adjacent said utilization means coupled through said electrical signal transmission cable means for determining the rate of operation of said reversible motive means.

* * * * *